United States Patent
Ohira et al.

(10) Patent No.: US 7,139,479 B2
(45) Date of Patent: Nov. 21, 2006

(54) METHOD AND APPARATUS FOR OPTICAL NETWORK ADMINISTRATION

(75) Inventors: Masaki Ohira, Tokyo (JP); Masahiro Takatori, Chiyoda-ku (JP); Yuichi Yamaguchi, Tokyo (JP); Toshiyuki Atsumi, Tokyo (JP); Tomohiro Mori, Tokyo (JP); Ryuji Ishii, Tokyo (JP); Kentarou Watanabe, Tokyo (JP); Toru Okamoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 624 days.

(21) Appl. No.: 10/038,332

(22) Filed: Oct. 23, 2001

(65) Prior Publication Data

US 2002/0131101 A1    Sep. 19, 2002

(30) Foreign Application Priority Data

Mar. 16, 2001    (JP)    ............... 2001-075362

(51) Int. Cl.
*H04B 10/08*    (2006.01)
*H04B 17/00*    (2006.01)

(52) U.S. Cl. ....................................................... 398/33

(58) Field of Classification Search ............ 398/25–27, 398/30–34
See application file for complete search history.

(56) References Cited

U.S. PATENT DOCUMENTS

| | | | | |
|---|---|---|---|---|
| 5,500,756 A | * | 3/1996 | Tsushima et al. | ........... 398/181 |
| 5,956,165 A | * | 9/1999 | Fee et al. | ...................... 398/78 |
| 6,005,696 A | * | 12/1999 | Joline et al. | .................. 398/25 |
| 6,108,113 A | * | 8/2000 | Fee | ............................. 398/16 |
| 6,169,754 B1 | | 1/2001 | Sugawara et al. | |
| 6,504,646 B1 | * | 1/2003 | Amoruso | ................. 359/341.1 |
| 6,826,200 B1 | * | 11/2004 | Pick et al. | ................... 370/535 |
| 2001/0033570 A1 | * | 10/2001 | Makam et al. | ............. 370/373 |
| 2002/0112182 A1 | * | 8/2002 | Chang et al. | ............... 713/201 |

FOREIGN PATENT DOCUMENTS

JP    11-191754    7/1999

* cited by examiner

*Primary Examiner*—Shi K. Li
(74) *Attorney, Agent, or Firm*—Townsend and Townsend and Crew LLP

(57) ABSTRACT

An optical transmission network allows transmission monitoring zones to be set up or changed in a flexible manner, and allows simultaneous monitoring of communication quality for each of these monitoring zones. Also, provided is an optical transmission zone service provider that varies user fees according to communication quality in the used zones.

10 Claims, 13 Drawing Sheets

FIG.3

| Category<br>Monitoring information | Setting S1 | Setting S2 | Setting S3 | Setting S4 |
|---|---|---|---|---|
| Monitoring zone | from Node A to Node E | from Node B to Node D | from Node D to Node F | from Node A to Node F |
| Monitoring direction | Bi-directional | Bi-directional | Uni-directional | Bi-directional |
| Monitoring wavelength | $\lambda 1$ | $\lambda 1, \lambda 2$ | $\lambda 2$ | $\lambda 3, \lambda 4, \lambda 5$ |
| Monitored information (communication alarms) | Optical input interruption alarm / Frame out-of-sync alarm / Near End failure alarm / Far End failure alarm / BER threshold exceeded / Link mismatch alarm | Optical input interruption alarm / Frame out-of-sync alarm / Near End failure alarm /Far End failure alarm / BER threshold exceeded/ Link mismatch alarm | Optical input interruption alarm / Frame out-of-sync alarm / Near End failure alarm / Far End failure alarm / BER threshold exceeded / Link mismatch alarm | Optical input interruption alarm / Frame out-of-sync alarm / Near End failure alarm / Far End failure alarm / BER threshold exceeded / Link mismatch alarm |
| Monitored information (performance information) | Error count / Error duration (sec) (ES) / Error duration (sec) (SES) / Frame out-of-sync time (sec) / Service downtime (sec) | Error count / Error duration (sec) (ES) / Error duration (sec) (SES) / Frame out-of-sync time (sec) / Service downtime (sec) | Error count / Error duration (sec) (ES) / Error duration (sec) (SES) / Frame out-of-sync time (sec) / Service downtime (sec) | Error count / Error duration (sec) (ES) / Error duration (sec) (SES) / Frame out-of-sync time (sec) / Service downtime (sec) |

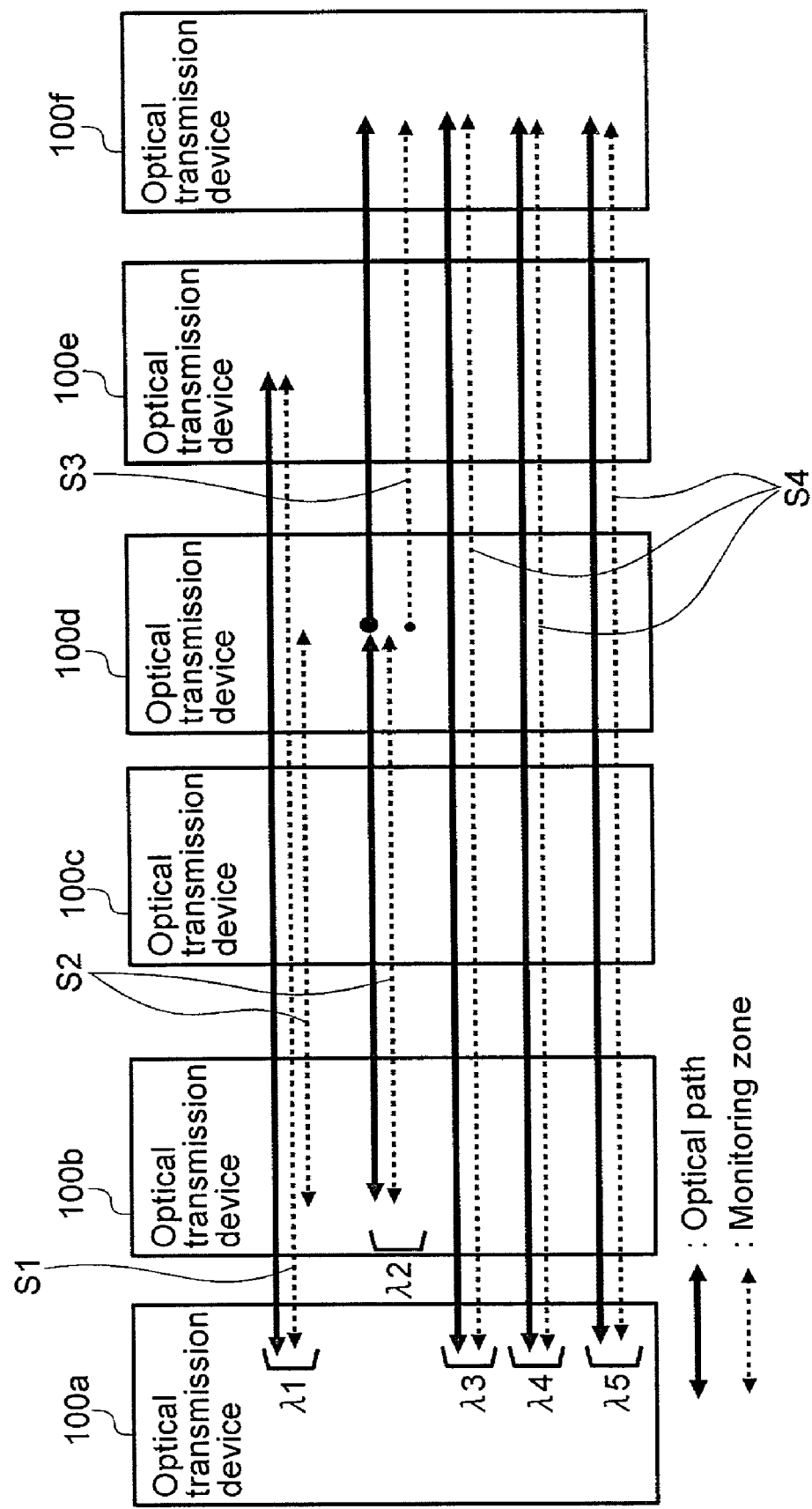

METHOD AND APPARATUS FOR OPTICAL NETWORK ADMINISTRATION

CROSS-REFERENCES TO RELATED APPLICATIONS

This application is related to and claims priority from Japanese Patent Application No. 2001-075362, filed on Mar. 16, 2001.

BACKGROUND OF THE INVENTION

The present invention relates to an optical transmission network administration device, an optical transmission device, an optical transmission system equipped with these devices, a method for monitoring optical transmission networks, and a monitoring service.

An example of a monitoring method for monitoring optical data transmissions for error and performance conditions in an optical transmission network administration zones is the International Telecommunication Union (ITU-T) Recommendation G.707, which presents a standard based on SDH (Synchronous Digital Hierarchy). This recommendation describes R section monitoring for regenerative repeater zones, M section monitoring for multiplexed end station zones, and fixed monitoring and single-layer tandem connection monitoring such as path monitoring and tandem connection monitoring and the like.

However, such standards are typically created with a view that do not always accommodate actual operating conditions and practical maintenance requirements. Obstacles encountered during implementation and subsequent real-world experiences in the field oftentimes require more capability than anticipated by the standards on which the systems are based.

With the rapidly changing demands of the current optical communication market, there is a need for a technology in optical transmission networks to provide optical transmission administration and maintenance that is easy operate and provides flexibility in the maintenance environment.

SUMMARY OF THE INVENTION

The present invention provides an optical communication system and a method for monitoring transmission paths comprising, at each of a plurality of optical transmission devices, receiving a transmission signal and a received monitoring instruction signal. Based on the received signals: transmitting the received transmission signal along with added monitoring information to a next optical transmission device; transmitting the received transmission signal to a next optical transmission device; or performing end-point processing based on monitoring information contained in the received transmission signal.

BRIEF DESCRIPTION OF THE DRAWINGS

FIG. 3 shows monitoring information 50 according to an illustrative embodiment of the invention;

FIG. 4 is a schematic drawing of optical path monitoring zones and optical paths;

DESCRIPTION OF THE SPECIFIC EMBODIMENTS

Figure 1:
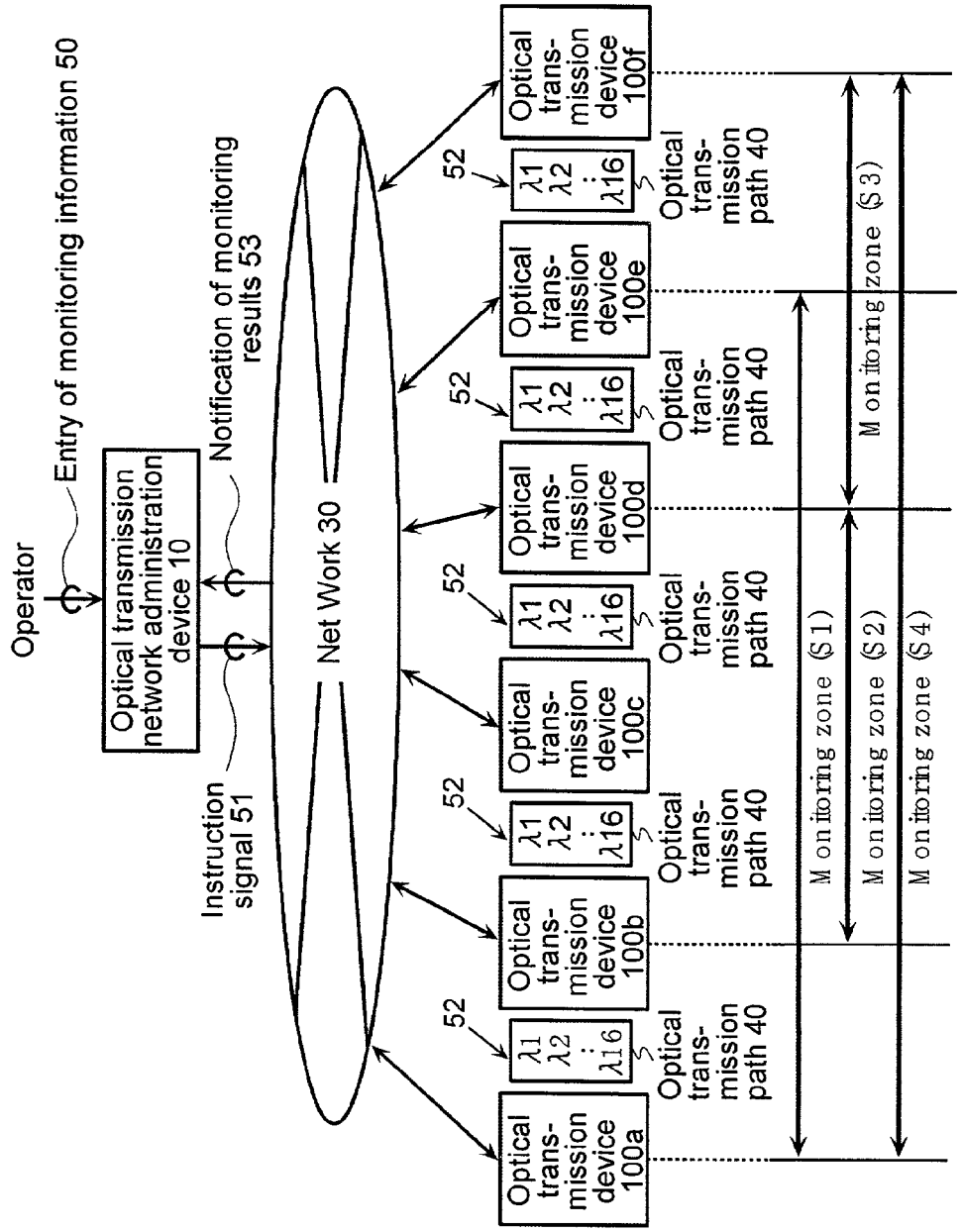
FIG. 1 is a drawing of the architecture of an optical transmission system in an optical transmission network according to an illustrative embodiment of the invention.

Japanese laid-open patent publication number Hei 9-321729 describes an optical transmission device architecture that allows sending and receiving of signals without terminating monitor maintenance information contained in an overhead region.

Japanese laid-open patent publication number Hei 11-191754 describes a monitoring test for transmission zones that uses an optical path interface to multiplex or demultiplex test signals.

The optical transmission device presented in commonly owned U.S. Pat. No. 6,169,754 describes a network administration device which can instruct an optical transmission device that performs end-point processing in an overhead region to not perform end-point processing.

In the wavelength-multiplexed optical network presented in Japanese laid-open patent publication number Hei 11-191754, a dedicated test signal is routed or looped back to confirm continuity in a specified zone. However, there is no description of an optical transmission network administration device that can freely set up the transmission zones to be monitored and that can provide unified management of monitoring operations.

The object of the present invention is to provide a technology for setting up multiple monitoring zones in an optical transmission network containing multiple optical transmission devices transmitting optical signals through optical transmission paths. Another object is to provide a technology where an optical transmission device in a transmission zone set up by an operator can perform specified monitoring operations, thus improving monitoring maintenance performance in the transmission network. Another object is to provide an optical transmission system that allows monitoring zones to be set up and changed freely and flexibly, thereby providing an optical transmission zone provider service that allows a communication business that uses an optical transmission network to provide optical transmission zones in the optical transmission to another communication business.

In order to solve the problems described above, the present invention provides an optical transmission system that includes a plurality of optical transmission devices transmitting frame signals through optical transmission paths and an optical transmission network administration device managing the plurality of optical transmission devices. The optical transmission network administration device includes a monitoring information input module and an instruction signal transmitter. The monitor information input module receives monitor information used to execute specified monitoring operations at least a first optical transmission device serving as a monitor starting point out of the optical transmission devices to be monitored. The instruction signal transmitter sending an instruction signal to at least the first optical transmission device based on the monitoring information entered through the monitoring information input module. At least the first optical transmission device includes an instruction signal receiver receiving the instruction signal transmitted from the instruction signal transmitter and a monitoring processor performing, based on the instruction signal received by the instruction signal receiver, specified monitoring operations on a specified region in a frame signal transmitted through the optical transmission paths.

Furthermore, the present invention also relates to an optical transmission zone provider service wherein a first communication business provides a second communication business with an optical transmission zone containing a first optical transmission device and a second optical transmission device out of a plurality of optical transmission devices. The first communication business performs communication operations using an optical transmission network including an optical transmission path and the plurality of optical transmission devices transmitting optical signals through the optical transmission path.

An optical transmission system using an optical transmission network administration device and an optical transmission device according to an embodiment of the present invention will be described using the figures.

In this embodiment of the present invention, monitoring process settings and the transmission zones to be monitored can be flexibly changed for individual transmission zones in an optical transmission network. Also, the monitoring and maintenance performance in a transmission network can be improved.

FIG. 1 shows the architecture of an optical transmission system according to this embodiment.

This optical transmission system includes: multiple optical transmission devices 100 transmitting transmission signals 52 (frame signals within the transmission devices) by way of optical transmission paths 40; and a optical transmission network administration device 10 administering the multiple optical transmission devices 100. The transmission signal format used in the optical transmission paths 40 is a multiplexed signal transmission format in which different optical wavelengths are carried by a single optical transmission path. The optical transmission paths 40 can also use a format where a single signal is transmitted through multiple optical transmission paths. Furthermore, the optical transmission paths 40 can use a format that uses multiple optical transmission paths, some of which carry optically multiplexed signals and some of which carry single signals.

Figure 2:
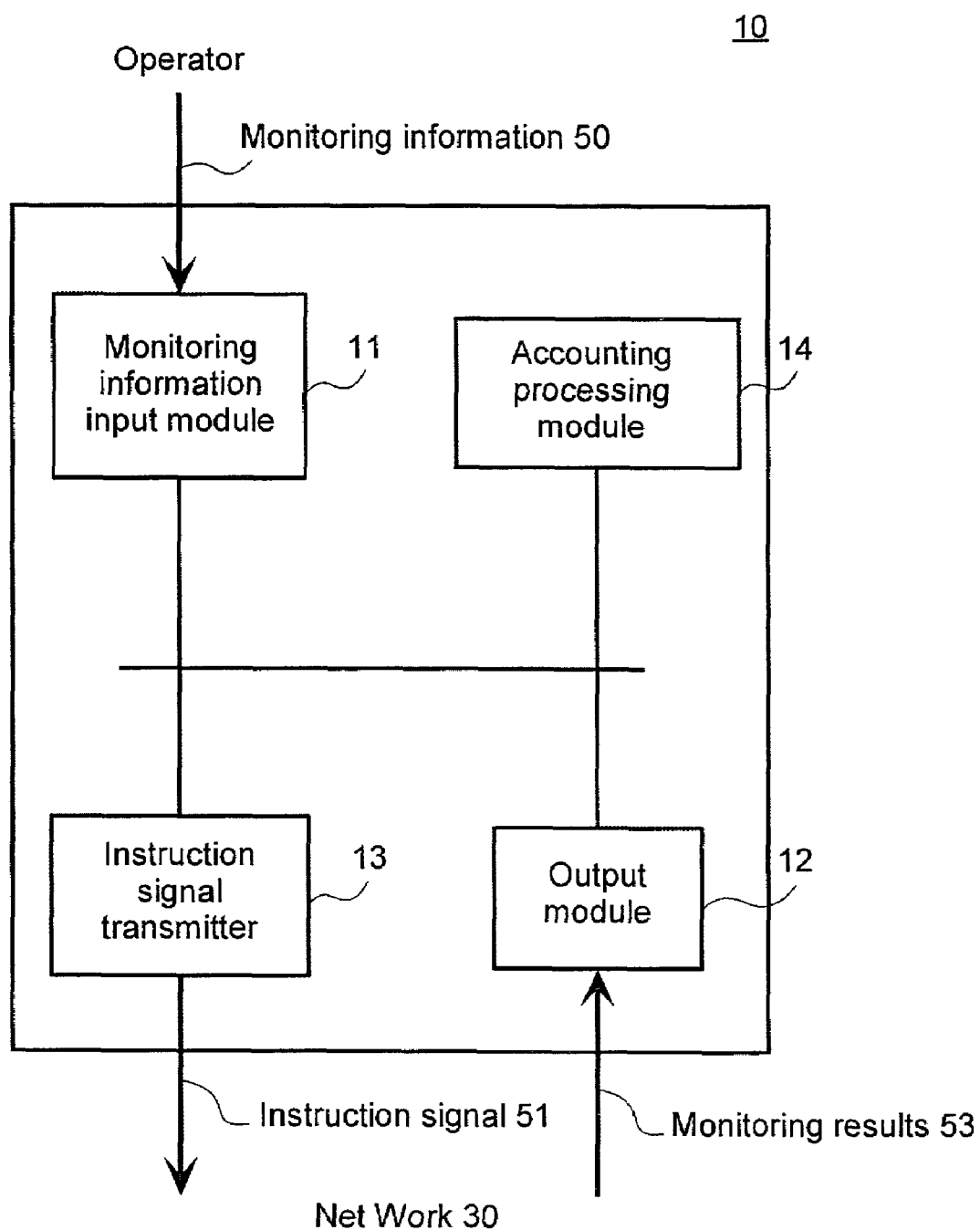
FIG. 2 is a drawing of the architecture of an optical transmission network administration device according to an illustrative embodiment of the invention.

FIG. 2 is a block diagram showing the architecture of the optical transmission network administration device 10 according to this embodiment. This optical transmission network administration device 10 administers the multiple optical transmission devices 100 transmitting the transmission signals 52 through the optical transmission paths 40. The optical transmission network administration device 10 includes: a monitoring information input module 11 for inputting monitoring information 50 used to execute specified monitoring processes for the optical transmission devices 100 to be monitored; an instruction signal transmitter 13 for transmitting instruction signals 51 for performing monitoring processes indicated by the received monitoring information 50; a storage module (though not shown) for storing results from the monitoring processes; and an output module 12 for outputting the monitoring process results stored in the storage module. An accounting processing module 14 may also be provided to provide accounting processes for communication fees based on the monitoring zones.

The monitoring information 50 received by the monitoring information input module 11 should contain at least the information needed to execute specified monitoring processes for the optical transmission device 100 which serves as the starting point for monitoring and the optical transmission device 100 which serves as the end point for monitoring. In order to identify the monitoring interval, the starting point for monitoring, the end point for monitoring, and the monitoring path are needed. Thus, the monitoring information 50 must contain the starting point for monitoring, the end point for monitoring, and a monitoring zone information to identify a monitoring path. The instruction signal 51 referred to above is a signal that provides instructions for insertion of specified monitoring parameters, pass-through, and end-point processing into a portion of the frame signal, hereinafter referred to as region X.

For example, both SDH and SONET standards define the processing (transmission, multiplexing/demultiplexing, and so on) of a synchronous multiplexed signal (frame signal) which comprises a main signal portion referred to as a "payload" in which digitized main signals are multiplexed, and signals referred to as "overheads", added to the payload, for administration and maintenance operations for a transmission apparatus and communication network.

The overheads include pointers which are used to perform stuff controls such as frame phase synchronization and frequency adjustment to provide a transmission system which has a less transmission delay and a higher administration and maintenance operation performance than conventional digital synchronous transmission apparatuses. The overheads added to the frame are classified into a section overhead (SOH) and a line overhead (LOH).

The section overhead is used for administration and maintenance operations for each transmission span between transmission apparatuses and regenerators (defined as a section), and generated in an apparatus (including a regenerator), transmitted through a transmission span, and terminated at a next apparatus. The line overhead is used for administration and maintenance operations for each transmission interval between transmission apparatuses which process multiplexed main signals (defined as a line). The line overhead is generated in a transmission apparatus, transmitted through transmission spans and regenerators, and terminated at a next multiplexing apparatus.

In accordance with the invention, in the case of SDH and SONET standard, certain unused portions of the overhead constitute what is referred to herein as "region X." Of course, the invention is not limited to the SDH and SONET standard. It is understood that other standards which define such administrative and maintenance fields and which have unused portions, which can be similarly adapted in accordance with the invention to provide a "region X." The following discussion is made in terms of known standards to facilitate the description of the invention.

The instruction signals 51 sent to the optical transmission devices 100 will be described in detail below. The instruction signal 51 sent to the optical transmission device 100 that is configured as the monitoring start point of the specified monitoring zone instructs the optical transmission device 100 to insert specified monitoring parameters in the region X of the overhead in the frame signals contained in the transmission signal 52. The instruction signal 51 sent to the optical transmission device 100 that is configured as the monitoring end point of the specified monitoring zone instructs the optical transmission device 100 to perform end-point processing on the monitoring parameters in the region X of the frame signals carried in the transmission signal 52. However, there is no need to send an end-point instruction signal 51 if the optical transmission device 100 that serves as the end point is set up to perform end-point processing on the maintenance information in the region X. The instruction signal 51 sent to the optical transmission devices 100 that are not configured either as the monitoring end point or the monitoring start point, but rather are configured as the relay points of the specified monitoring zone, instructs those optical transmission devices 100 to pass through the monitoring parameters contained in the region X. However, there is no need to send a pass-through instruction signal 51 if the optical transmission devices 100 that serve as the relay points are already set up to pass through the maintenance information in the region X.

For each set of monitoring information 50 entered through the optical transmission network administration device 10, the convention adopted for discussion purposes is to refer to the region in the overhead corresponding to monitoring zone i as region Xi. Thus, the region in the overhead corresponding to monitoring zone 1 is referred to as region X1. If multiple monitoring zones are set up and there is overlap in some of the optical transmission devices 100 in the monitoring zones, different regions Xi in the transmission signal 52 will be specified. Identifying information contained in the region will indicate the corresponding monitoring zone. As a result, an optical transmission device 100 receiving instruction signals 51 for multiple monitoring zones will be able to perform monitoring operations according to each of these instructions signals 51 by using the corresponding Xi specified for that monitoring zone. The transmission signal 52 used for monitoring operations can be a dedicated monitor signal having a predetermined wavelength. Furthermore, it would also be possible to have the operator be able to switch between different methods for indicating signals to be used for monitoring. The region X can, for example, be in free bytes in a redundant region X in an overhead region or the like. The monitoring parameters referred to here consists of monitoring maintenance information used for specific monitoring operations indicated by the monitoring categories information for providing performance monitoring or communication alarms as specified by the operator.

The output module 12 is used to output monitoring operation results 53 from the multiple optical transmission devices 100.

FIG. 3 shows an example of the monitoring information 50 entered by an operator in the optical transmission network administration device 10 according to this embodiment.

FIG. 4 shows a simplified diagram of the optical paths indicating the logical structure of the monitoring zones and the optical transmission network.

Monitoring zone information is entered by an operator to indicate monitoring zones to allow the optical transmission network administration device 10 to identify monitoring zones. The monitoring zone information can be information that identifies either the starting and terminal optical transmission devices 100 or the monitoring transmission path.

This is because if information to identify monitoring zones are already stored in the optical transmission network administration device 10, a monitoring zone can be identified from either point.

Monitoring direction information indicates the direction of the transmission signal 52 performing monitoring operations. This information is used to indicate whether uni-directional monitoring or bi-directional monitoring is to be performed. For example, if a monitoring zone is defined from a first optical transmission device 100 and a second optical transmission device 100, and uni-directional monitoring is indicated, the first optical transmission device 100 will be instructed to serve as a monitoring starting point and the second optical transmission device 100 will be instructed to serve as a monitoring end point. If bi-directional monitoring is indicated, the first optical transmission device 100 and the second optical transmission device 100 will be instructed to serve as both monitoring starting points and monitoring end points.

In the monitoring information 50, monitoring information categories are categories set up ahead of time for providing performance monitoring and communication alarms. For example, this can be monitoring parameters (monitoring maintenance information) used in monitoring operations.

Examples for performance monitoring include: error counts (CV), error duration (seconds) (ES, SES), out-of-sync time in the transmission signal 52 (sec) (SEFS), and service downtime (sec) (UAS). Communication alarms include optical input interrupt alarm (LOS), out-of-sync alarm for the transmission signal 52 (LOF), Near End failure alarm (AIS), Far End failure alarm (RDI), BER threshold exceeded (BER), and Link mismatch alarm (TIM).

Monitoring information is entered by an operator. If the optical signal transmitted through the optical transmission paths 14 is a multiplexed signal composed of transmission signals 52 having multiple optical wavelengths ( 1, 2, 3, . . . , I), th i s information is set up to allow the optical transmission devices 100 to be instructed to perform monitoring operations for optical signals with different optical wavelengths. For example, the information can indicate the wavelength of the optical wavelength signal used for monitoring operations or the signal or the like of the optical wavelength signal used for monitoring operations. However, if the optical transmission network administration device 10 automatically determines the signal to be used for monitoring operations based on an indicated sequence or the like, it would be possible to eliminate the entry of the monitoring wavelength information by the operator. Also, one common set of monitoring information 50 can be used to set up different optical wavelength signals.

Based on the monitoring information 50, the optical transmission network administration device 10 identifies the optical transmission devices 100 in the indicated monitoring zone and generates and sends instruction signals 51 so that these optical transmission devices 100 can perform monitoring operations using the monitoring parameters indicated by the monitoring category information contained in the monitoring information 50. It would also be possible to not send the instruction signal 51 if the optical transmission device 100 is already set up with information identical to what is contained in the monitoring operation instructions in the instruction signal 51. If this is the case, the contents of the monitoring operation information set up in each of the optical transmission devices 100 can be stored in the optical transmission network administration device 10 so that whether or not the instruction signal 51 is to be sent to the optical transmission device 100 is determined by comparing the entered monitoring operation information with the stored settings.

The following is a description, with references to FIG. 3 and FIG. 4, of an embodiment in which a transmission signal 52 is a signal formed by multiplexing different optical wavelengths, and where specific regions X are indicated for each wavelength in the transmission signal 52 to provide monitoring operations. In this case, the optical transmission network administration device 10 uses transmission signals 52 at specific wavelengths to perform monitoring operations for each of the optical transmission devices 100.

Of the optical transmission devices 100 in the optical transmission network, the settings (hereinafter referred to as "settings S") for a transmission zone between an optical transmission device 100A and an optical transmission device 100F will be considered.

The monitoring wavelength information for the setting S1 indicates a single wavelength (1). Thus, based on this monitoring wavelength information, the optical transmission network administration device 10 identifies the wavelength (1) to be used for monitoring. This identification of wavelengths to be used for monitoring can also be performed automatically by the optical transmission network administration device 10 as described above. Next, the optical transmission network administration device 10 sends an instruction signal 51 to the optical transmission devices 100 contained in the monitoring zone in the setting S1 so that the transmission signal 52 can be used for the identified optical wavelength (1).

Similarly, based on the monitoring wavelength information, the setting for the zone between the optical transmission device 100B and the optical transmission device 100D (setting S2) indicates that the optical transmission network administration device 10 will provide monitoring operation instructions using transmission signals 52 with two different wavelengths (1, 3). The setting for the zone between the optical transmission device 100D and the optical transmission device 100F (setting S3) indicates that the optical transmission network administration device 10 will provide monitoring operation instructions using a transmission signal 52 with a single wavelength (2). The setting for the zone between the optical transmission device 100A and the optical transmission device 100F (setting S4) indicates that the optical transmission network administration device 10 will provide monitoring operation instructions using transmission signals 52 with three different wavelengths (3, 4, 5).

Figure 5:
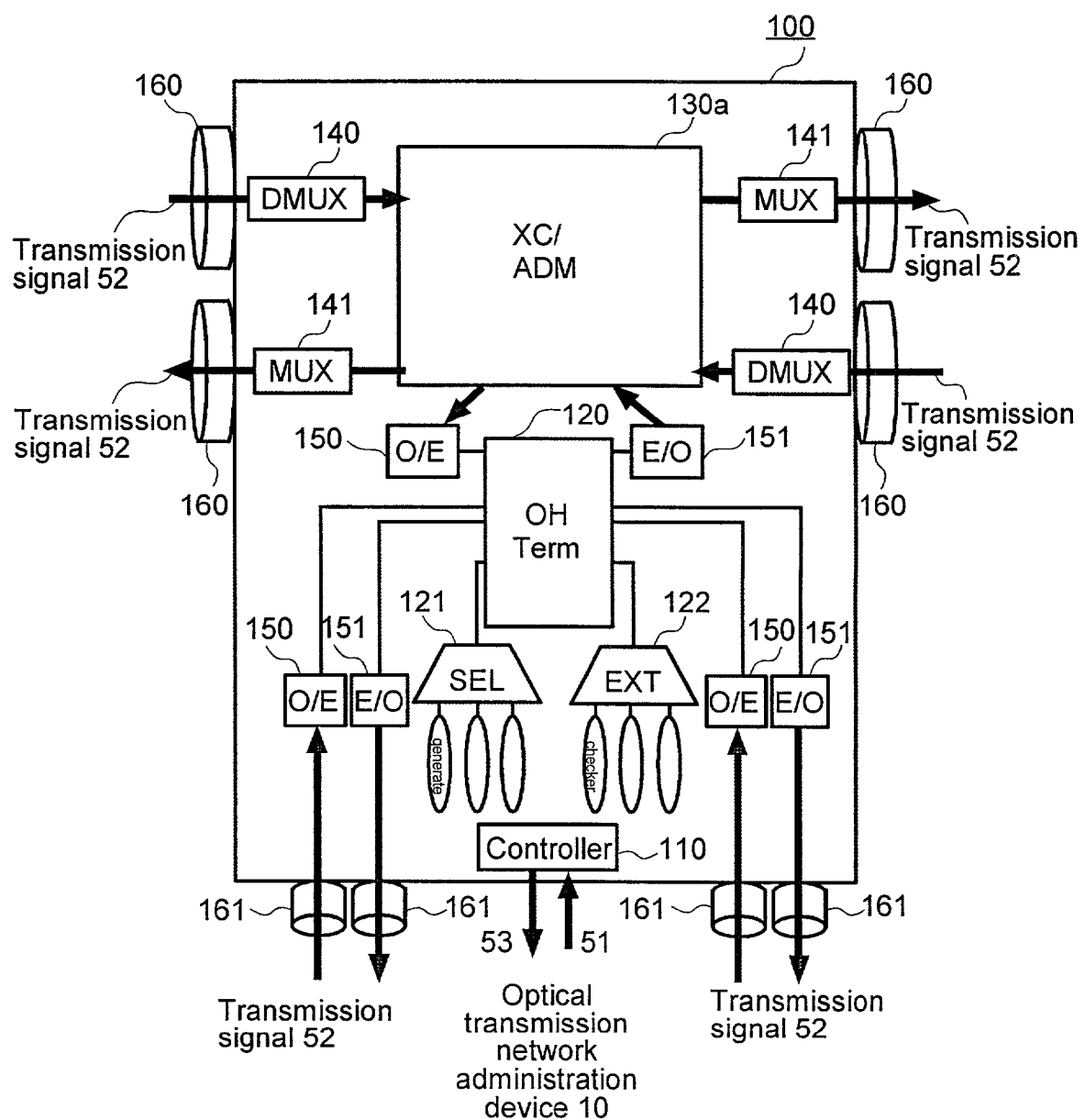
FIG. 5 is a drawing of the architecture of an optical transmission device 100 (an optical XC/ADM device) in an optical transmission network according to an illustrative embodiment of the invention.
Figure 6:
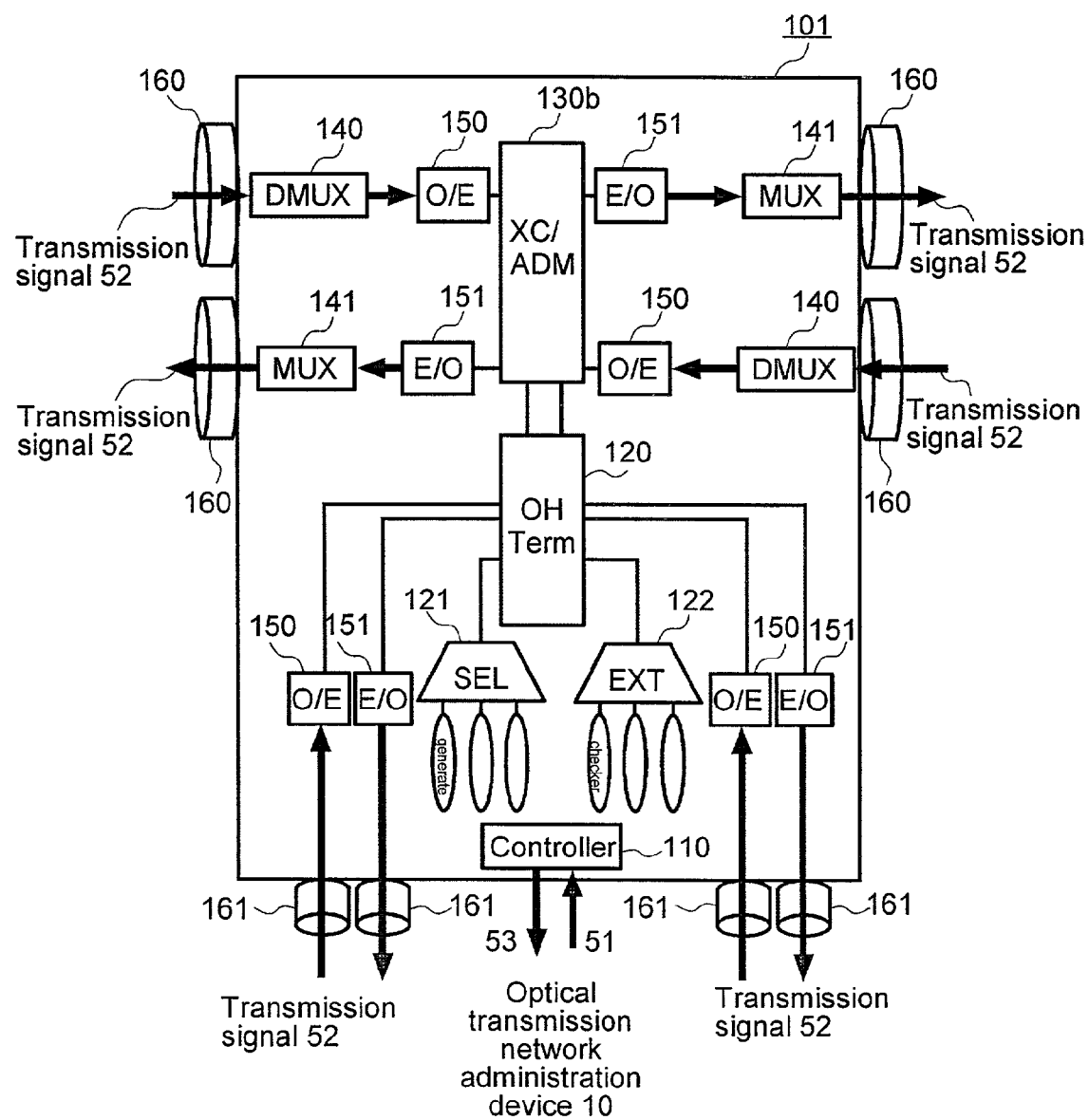
FIG. 6 is a drawing of the architecture of an optical transmission device 100 (an electrical XC/ADM device) in an optical transmission network according to an illustrative embodiment of the invention.
Figure 7:
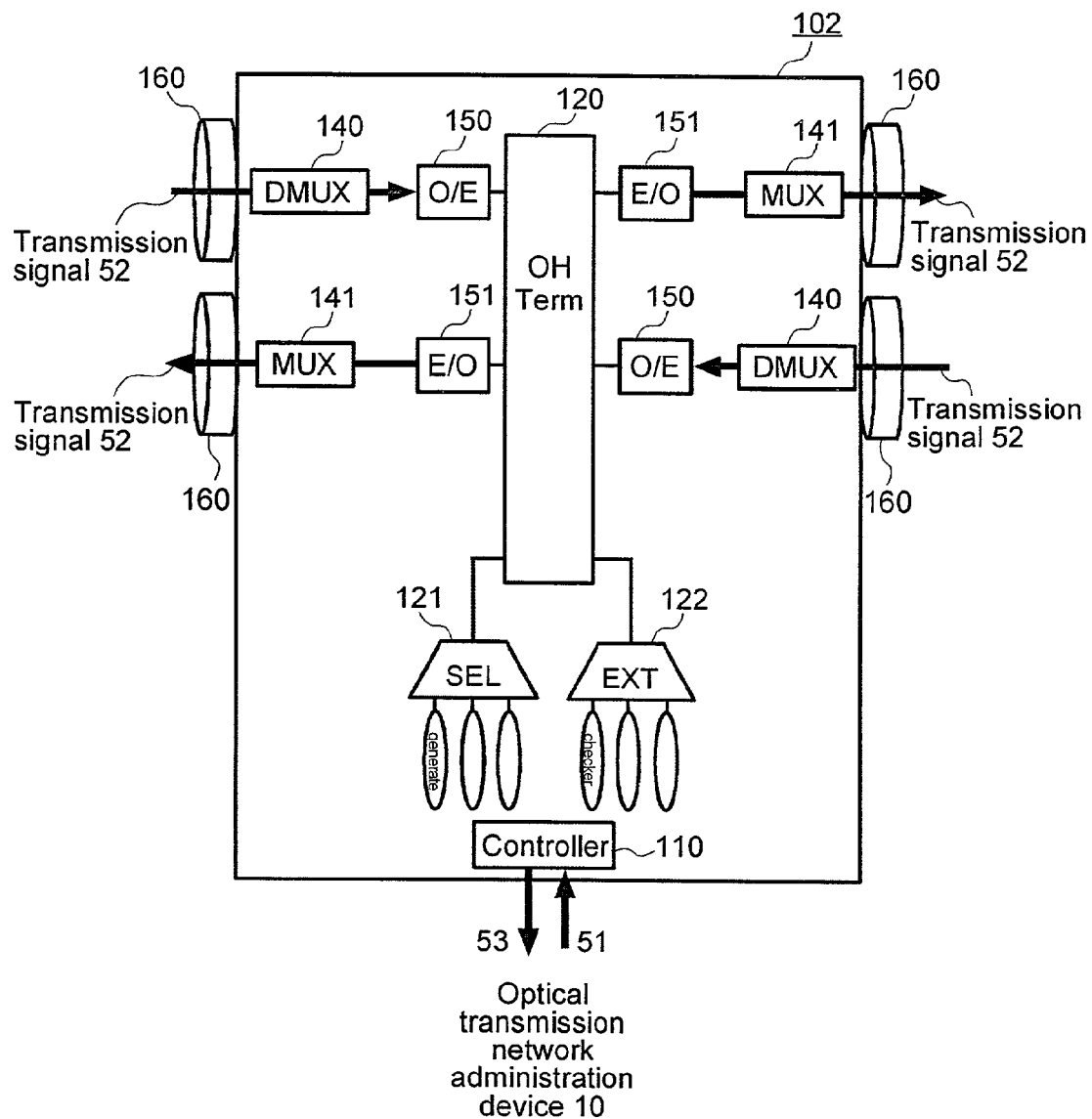
FIG. 7 is a drawing of the architecture of an optical transmission device 100 (a dedicated relay device) in an optical transmission network according to an illustrative embodiment of the invention.

FIG. 5, FIG. 6, and FIG. 7 show block diagrams indicating the architectures of optical transmission devices according to an embodiment of the present invention. The optical transmission devices 100 and 101 shown in FIG. 5 and FIG. 6 are add-drop multiplexing/demultiplexing devices (ADM devices) that store low-speed multiplexed signals formed from a primary signal multiplexed with multiple overhead signals and high-speed multiplexed signals formed from a primary signal multiplexed with two overhead signals. Low-speed multiplexed primary signals are inserted (added) to high-speed multiplexed primary signals, low-speed multiplexed primary signals are split off (dropped) from high-speed multiplexed primary signals, high-speed multiplexed primary signals are swapped (cross-connected) or passed through. The optical transmission device 102 is a dedicated relay device that does not perform add drop functions for low-speed multiplexed primary signals and high-speed multiplexed signals. The optical transmission devices in this embodiment are selected as appropriate from the optical transmission device 100, 101, and 102 shown in FIG. 5, FIG. 6, and FIG. 7. The optical transmission device 100 shown in FIG. 5 will be used as the optical transmission system in the description of this embodiment. The speed of the transmission signal 52 and the like can follow SDH standards. It would also be possible to have the number of multiplexed signals that are carried to be varied according to the multiplexed signal types that are carried.

FIG. 5 shows an embodiment of the optical transmission device 100 according to this embodiment.

The optical transmission device 100 shown in FIG. 5 is an optical XC/ADM device that processes received optical signals without converting them to electrical signals. Received wavelength-multiplexed signals are separated by wavelength, and circuit-switching and the like are performed directly on these optical wavelength signals. While the optical transmission device 100 in this embodiment is an optical XC/ADM device, overhead generation and insertion require electrical signals. Thus, optical-electrical signal conversion is performed in the circuit switching/multiplexing/demultiplexing module (XC/ADM 130a), which performs circuit switching and optical multiplexing/demultiplexing and the overhead processing module (OH TERM 120), which performs overhead processing.

The optical transmission device 100 shown in FIG. 5 includes: a wavelength multiplexer (MUX 141) multiplexing multiple incoming optical signals and outputting a wavelength-multiplexed signal; a wavelength demultiplexer (DMUX 140) demultiplexing an incoming wavelength-multiplexed signal by wavelength and outputting multiple optical signals; an electrical-optical converter (E/O 151) converting an incoming electrical signal into an optical signal; an optical-electrical converter (O/E 150) converting an incoming optical signal to an electrical signal; an overhead processing module (OH TERM 120) performing, on multiple incoming electrical signals, monitoring operations indicated by a predetermined overhead region X; a circuit switching module (XC/ADM 130) performing circuit switching on incoming optical wavelength signals and performing add/drop operations on optical wavelength signals being monitored; an insertion overhead selection module (SEL 121) storing multiple monitoring parameters and selectively inserting specified monitoring parameters; an extraction information processing module (EXT 122) performing extraction operations of monitoring parameters for end-point processing; a receiver receiving an instruction signal 51 from the optical transmission network administration device 10 for executing monitoring operations; and a controller 110 (CONTROLLER) controlling the different modules in order to perform the monitoring operations indicated by the incoming instruction signal 51.

As shown in FIG. 5, there are optical transmission path ports 160, 161 for sending and receiving transmission signals 52 (the same applies to the optical transmission device 101 shown in FIG. 6). Any number of optical transmission path ports 160, 161 can be used (this applies to both FIG. 6 and FIG. 7).

The following is a detailed description of how the optical transmission device 100 shown in FIG. 5 performs monitoring operations indicated by the instruction signal 51 received from the optical transmission network administration device 10.

First, the controller 110 receives the instruction signal 51 from the optical transmission network administration device 10 and uses this instruction signal 51 to identify the overhead regions X used for monitoring operations and the monitoring parameters used for monitoring operations. For each identified region X, the controller 110 determines whether to insert, pass through, or apply end-point Processing for the monitoring parameters as the monitoring operation.

If the controller 110 determines that insertion is to be performed as the monitoring operation, the XC/ADM 130a is instructed to output the optical wavelength signal to be monitored to the OH TERM 120. The OH TERM 120 is instructed to select the indicated monitoring parameters using the SEL 121 and to insert this into the identified region X in the optical wavelength signal.

If the controller 110 determines that end-point processing is to be performed as the monitoring operation, the XC/ADM 130a is instructed to output the optical wavelength signal to be monitored to the OH TERM 120. The OH TERM 120 is instructed to extract the monitoring parameters contained in the identified region X of the optical wavelength signal and to have the EXT 122 perform end-point processing.

If the controller 110 determines that pass-through processing is to be performed as the monitoring operation, the XC/ADM 130a and the OH TERM 120 are controlled so that the monitoring parameters contained in the identified region X are passed through rather than stopped.

In this manner, the controller 110 controls the XC/ADM 130a and the OH TERM 120 so that monitoring operations indicated in the identified regions X can be performed.

The DMUX 140 receives optical wavelength-multiplexed signals from the optical transmission path port 160, separates the received signal into optical wavelength signals, and outputs the results to the XC/ADM 130a.

The XC/ADM 130a receives these optical wavelength signals and performs monitoring operations indicated in the monitoring parameters in the regions X according to instructions from the controller 110. More specifically, optical wavelength signals for which insertion processing is to be applied are sent to the OH TERM 120. The OH TERM 120 receives these signals, selects the indicated monitoring parameters using the SEL 121, and inserts these parameters into the region X of the optical wavelength signals.

Optical wavelength signals for which end-point processing is to be performed are sent by the XC/ADM 130a to the OH TERM 120. The OH TERM 120 receives these signals, extracts the monitoring parameters contained in the region X of these optical wavelength signals, and stores them in the EXT 122.

Optical wavelength signals for which pass-through processing is to be performed are sent by the XC/ADM 130a to the OH TERM 120. The OH TERM 120 receives these optical wavelength signals, extracts monitoring parameters from the region X of the optical wavelength signals, and inserts these into the indicated region X. If the position of the region X for which monitoring parameters are to be extracted/inserted is to be unchanged and if the instruction signal indicates that the monitoring parameters contained in this band are to be passed through without monitoring, the controller 110 of the transmission device 100 instructs the XC/ADM 130a to switch the optical transmission signal 52 to the appropriate path without sending it to the OH TERM 120. Based on such instructions, the XC/ADM 130a can receive this type of transmission signal 52 and switch it to an appropriate path without sending it to the OH TERM 120.

The optical wavelength signal on which monitoring operations were performed is then switched to a desired optical transmission path port 160. The circuit switching performed by the XC/ADM 130a can be to the optical transmission path port 160, the optical transmission path port 161, or can involve wavelength switching.

For example, if a wavelength signal is optically switched (to the optical transmission path port 160) and monitored, the optical signal is sent by way of the O/E 150 to the OH TERM 120. The OH TERM 120 performs overhead processing (overhead information extraction, monitoring, and insertion). Then, the signal goes through the E/O 151 back to the XC/ADM 130a, where it is switched to the optical transmission path port 160.

If optical circuit switching (wavelength conversion) and monitoring is to be performed on a wavelength signal, the optical signal is sent by way of the O/E 150 to the OH TERM 120. The OH TERM 120 performs overhead processing (overhead information extraction, monitoring, and insertion). Then, the E/O 151 performs wavelength conversion and sends the signal back to the XC/ADM 130a, which then outputs the signal to the MUX 141.

If dropping and monitoring is to be performed on an optical wavelength signal, the optical signal is sent by way of the O/E 150 to the OH TERM 120. The OH TERM 120 performs overhead processing (overhead information extraction, monitoring, and insertion). Then, the signal goes through the E/O 151 and is sent to a drop-side optical transmission path port 161.

Finally, if an optical signal from an add-side optical transmission path 161 is to be added and monitored, overhead processing (overhead information insertion) is performed on the optical signal by the OH TERM 120. Then, the E/O 151 performs wavelength conversion. The signal is received by the XC/ADM 130a, which outputs the signal to the MUX 141.

The OH TERM 120 monitors the monitoring parameters contained in the specified region X in the received transmission signal 52. The monitoring information 50 can include information indicating whether the monitoring parameters contained in the specified region X are to be monitored. If the monitoring information 50 indicates that monitoring is required, the optical transmission network administration device 10 sends the optical transmission device 100 an instruction signal indicating that the monitoring parameters contained in the specified region X are to be monitored.

The OH TERM 120 can select monitoring parameters indicated by the instruction signal out of the monitoring parameters contained in the SEL 121. The OH TERM 120 extracts the monitoring parameters contained in the indicated region X and transfers them to the EXT 122. The EXT 122 performs end-point processing on the received monitoring parameters. This end-point processing involves operations relating to monitoring maintenance of the monitored zone, e.g., determining the primary signal error count using the error detection code; detecting communication alarms, performance monitoring based on the error count; and detecting when the BER is exceeded. It would also be possible to have the OH TERM 120 perform predetermined operations on the region X in the received signal.

FIG. 6 shows an optical transmission device 101 according to this embodiment.

The optical transmission device 101 shown in FIG. 6 is an electrical XC/ADM device that converts received optical signals to electrical signals. A received optical wavelength-multiplexed signal is separated by wavelength into optical signals, which are then converted to electrical signals and send to the overhead processing module (OH TERM 120) and the circuit switching module (XC/ADM 130b).

Unlike the optical transmission device 100 shown in FIG. 5, the XC/ADM 130b of the optical transmission device 101 shown in FIG. 6 outputs an electrical signal rather than an optical signal. Otherwise, the architecture and features are similar.

FIG. 7 shows an optical transmission device 102 according to this embodiment. The optical transmission device 102 shown in FIG. 7 is a dedicated relay device.

Unlike the optical transmission device 101 shown in FIG. 6, the optical transmission device 102 shown in FIG. 7 does not include architecture and features (ADM) for adding and dropping operations between multiple low-speed multiplexed primary signals and high-speed multiplexed primary signals. Otherwise, the architecture and features are similar.

With the optical transmission device 100 according to the present invention and a transmission network or transmission system using the same, settings can be made and changed in a flexible manner for different monitoring zones in the optical transmission network, thus providing an optical transmission system that allows simultaneous monitoring of communication quality in different monitoring zones.

The following is a description using flowcharts of the sequence of operations performed by an optical transmission system according to this embodiment.

Figure 8:
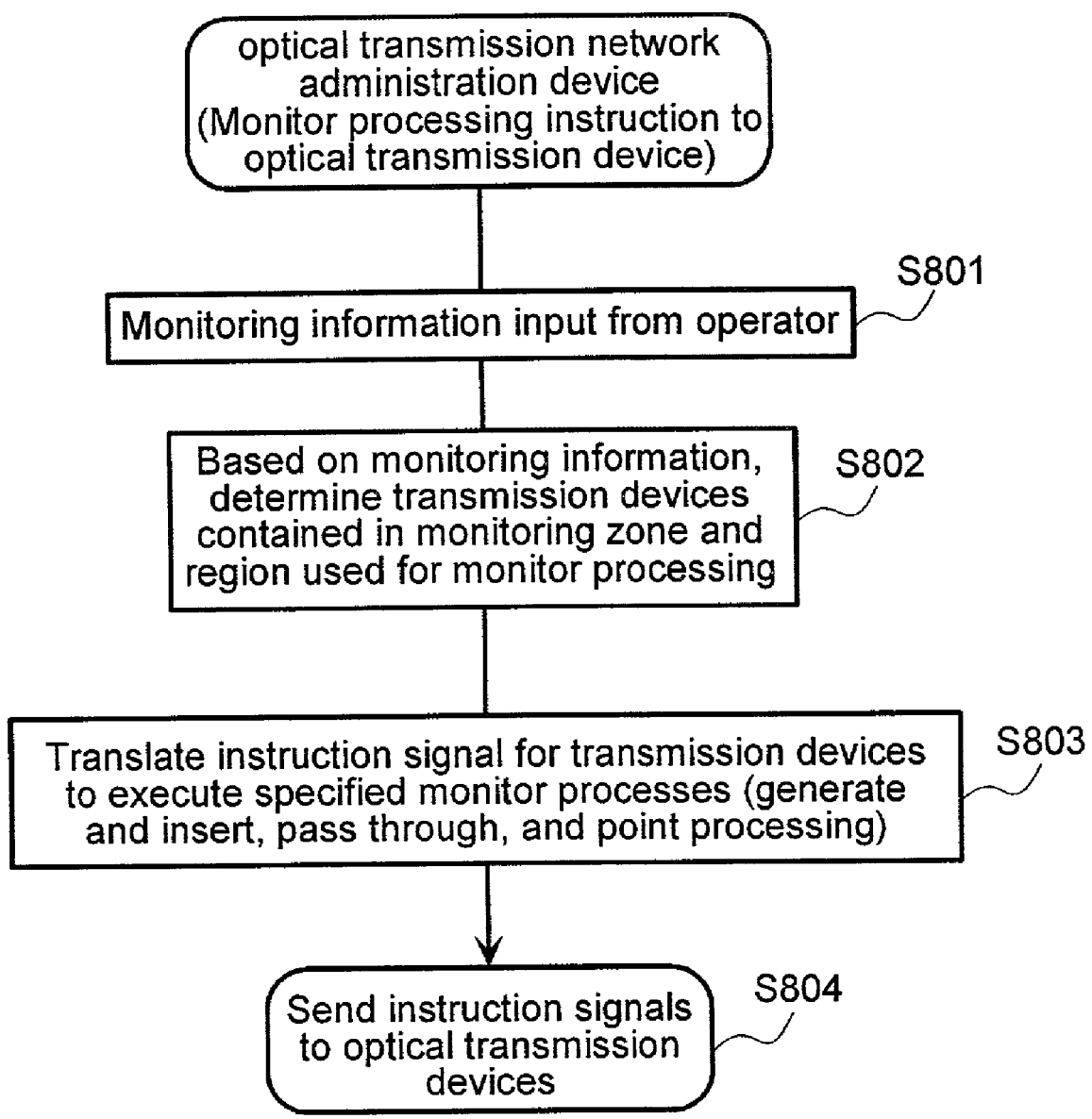
FIG. 8 is a flowchart showing the operations performed in sending monitoring operation instructions to an optical transmission device 100 by an optical transmission network administration device according to an illustrative embodiment of the invention.

FIG. 8 is a flowchart showing a first embodiment of the optical transmission network administration device 10.

1) An operator or the like enters monitoring information 50 into the optical transmission network administration device 10 in order to identify monitoring zones and perform monitoring operations (S801).

The entry of monitoring information 50 can be performed using input means separate from optical transmission network administration device 10, e.g., indirect or remote entry through a terminal or the like.

2) Based on the entered monitoring information 50, the optical transmission network administration device 10 identifies the optical transmission devices 100 contained in the monitoring zone, the region X in the transmission signal 52 having the information to be used for monitoring operations, and the specified monitoring categories. The optical transmission device 100 to serve as the monitor starting point, the optical transmission device 100 to serve as the monitoring end point, and the optical transmission devices 100 to serve as monitor relays are identified in the optical transmission devices 100 to be monitored (S802). This information is stored in the storage device in the optical transmission network administration device 10. If the operator enters the monitoring information 50 again, the information stored in the storage device can be used to simplify operator entry, e.g., if only the monitor starting point in a monitoring zone is to be changed, the past monitor end point and monitoring category information can be used directly.

3) The optical transmission network administration device 10 generates instruction signals 51 and sends them to the optical transmission devices 100 to be monitored in order to have them execute specified monitoring operations. More specifically, for the optical transmission device 100 configured as the monitor starting point, a signal is generated to provide instructions for the generation and insertion of the specified monitoring parameters into the region X indicated in the transmission signal 52. For the optical transmission device 100 configured as the monitor end point, a signal is generated to provide instructions for the extraction and end-point processing of the monitoring parameters contained in the specified region X of the transmission signal 52. For the optical transmission devices 100 configured as monitor relays, signals are generated to provide instructions for allowing the monitoring parameters contained in the indicated regions X to be passed through (S803).

4) The optical transmission network administration device 10 sends the generated instruction signals 51 to the optical transmission devices 100 (S804).

Figure 9:
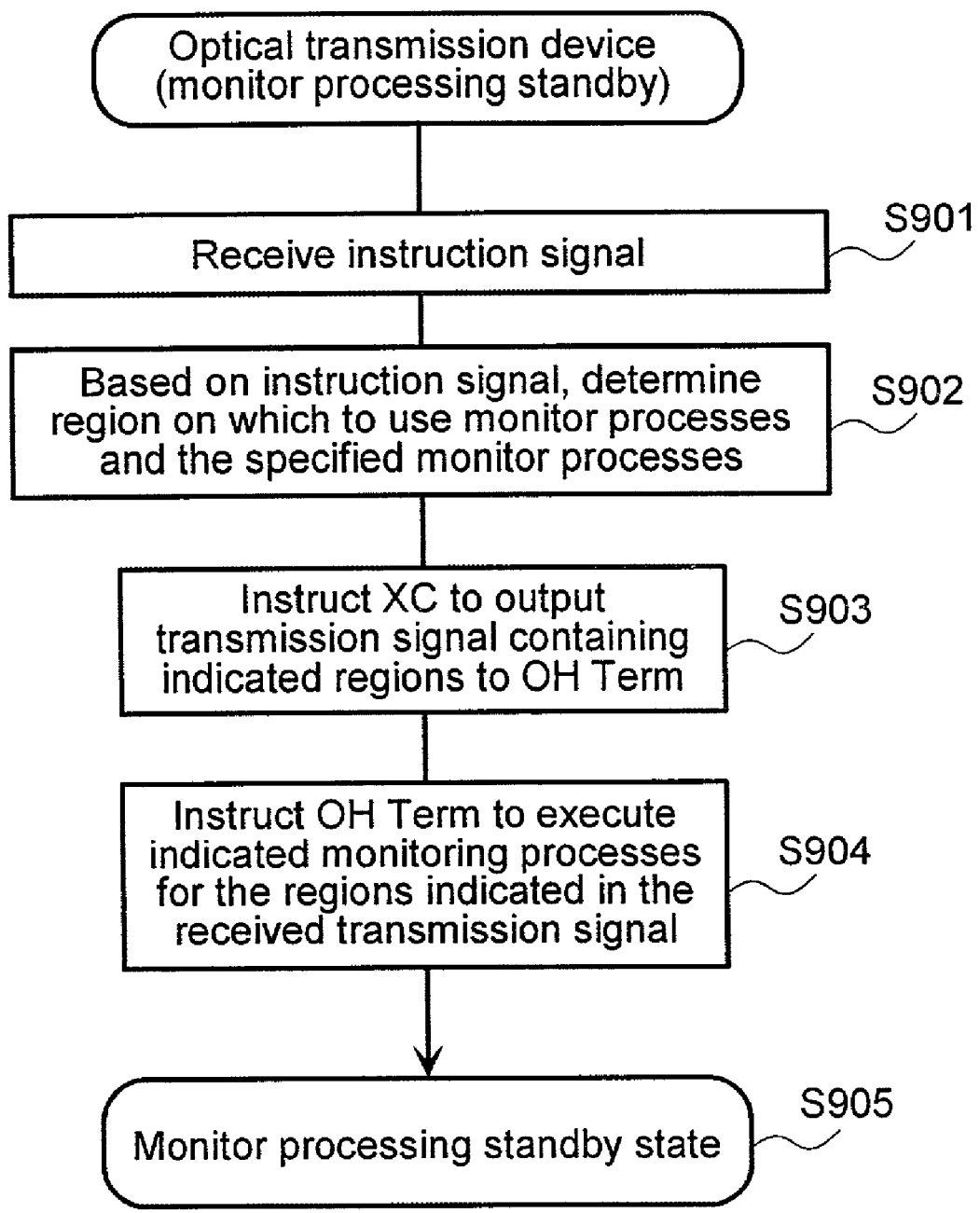
FIG. 9 is a flowchart showing the operations performed by a controller 110 of an optical transmission device 100 according to an illustrative embodiment of the invention in setting up monitoring operations.

FIG. 9 is a flowchart showing the sequence of control operations performed by the controller 110 of the optical transmission device 100 according to this embodiment.

1) Based on the received instruction signal 51, the optical transmission device 100 identifies a region X in the overhead of the transmission signal 52 containing information to be used for monitoring operations and the specified monitoring operations (S901, S902).

2) The XC/ADM 130 and the OH TERM 120 are instructed by the controller 110 to perform the indicated monitoring operations using the specified region X. More specifically, if the transmission signal 52 containing the specified region X is received, the XC/ADM 130 is instructed to send the transmission signal 52 containing the specified region X to the OH TERM 120 (S903). In the case of an optical signal, if the specified region X is specified for a specified wavelength in the optical transmission signal 52, the XC/ADM 130 is instructed to send transmission signals containing the specified wavelength with the specified region X to the OH TERM 120. Also, instead of sending the signal to the OH TERM 120, the instruction signal 51 may cause the controller 110 to instruct the XC/ADM 130 to pass through the transmission signal 52 by circuit switching the transmission signal to a desired optical transmission path port 160.

3) If the optical transmission device 100 is instructed to be a monitoring start point, the OH TERM 120 is instructed to select and extract the specified monitoring parameters from the SEL 121 and to insert these monitoring parameters into the specified region X. If the optical transmission device 100 is instructed to be a monitoring end point, the monitoring parameters contained in the specified region X are extracted and end-point processing is performed at the EXT 122. If the optical transmission device 100 is instructed to be a monitoring relay point, the OH TERM 120 is instructed to pass through the monitoring parameters contained in the specified region X rather than performing end-point processing.

Figure 10:
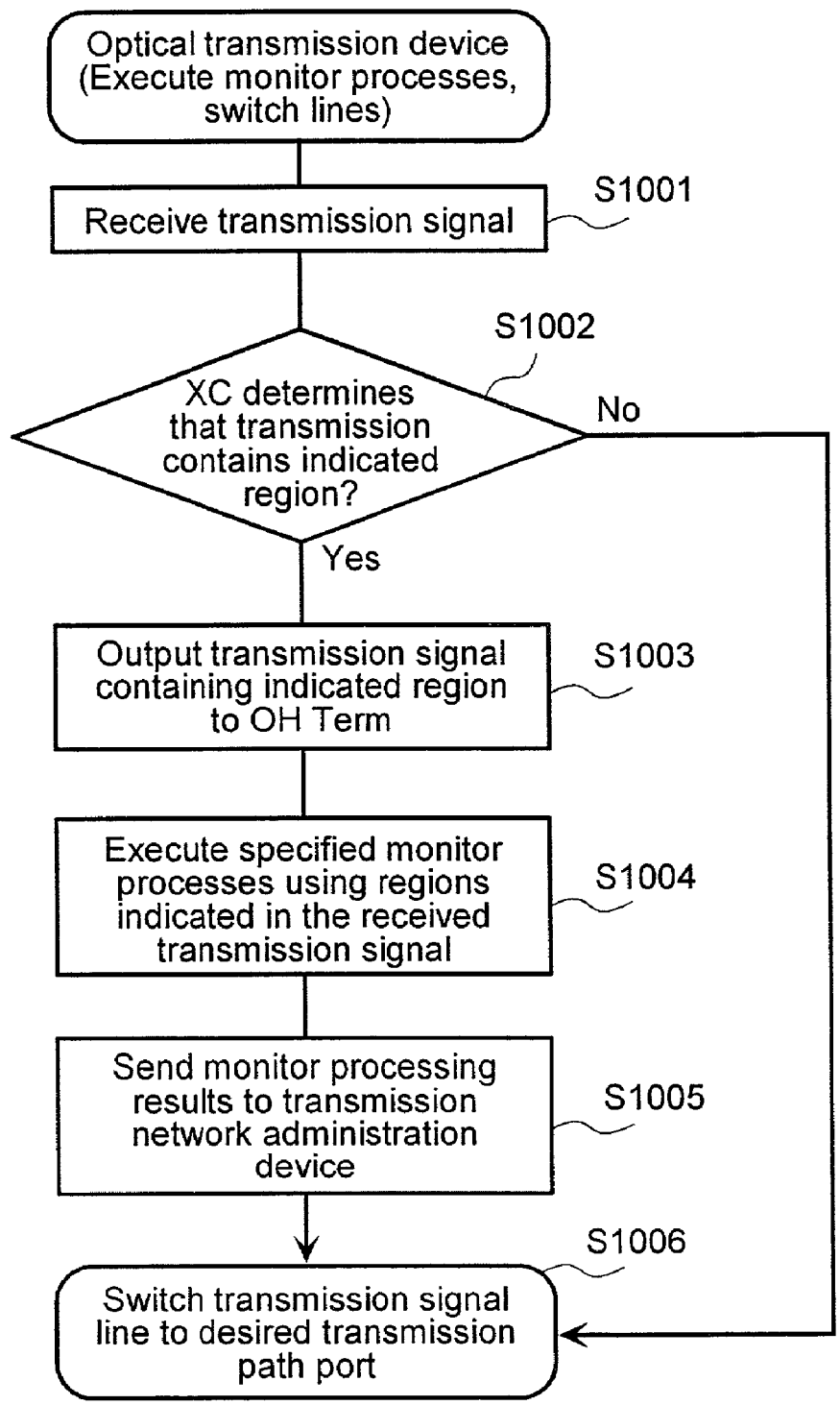
FIG. 10 is a flowchart showing how monitoring operations and circuit-switching operations for a transmission signal 52 are performed by an optical transmission device 100 according to an illustrative embodiment of the invention.

FIG. 10 shows a flowchart of the sequence of monitoring operations performed by the optical transmission device 100 according to this embodiment.

1) First, the optical transmission device 100, which is equipped with the XC/ADM 130 and the OH TERM 120 controlled by the controller 11O, receives an optical signal transmitted by way of the optical transmission path 40 (S1001). If the transmission signal 52 is an wavelength-multiplexed signal, the signal is divided into separate optical wavelength signals using the DMUX 140. The received optical signal is then converted into electrical signals by the O/E 150.

2) The converted transmission signal 52 is then sent to the XC/ADM 130. The XC/ADM 130 receives the signal and determines whether or not the transmission signal 52 contains the region X specified by the controller 110 (S1002). If the specified region X is specified for a transmission signal 52 having a specified wavelength, the XC/ADM 130 determines whether there is a transmission signal 52 (optical wavelength signal before conversion to an electrical signal) with the specified wavelength.

3) If the XC/ADM 130 determines that there is a transmission signal 52 containing the specified region X, the signal is sent to the OH TERM 120 (S1003).

4) The OH TERM 120 receiving the transmission signal 52 executes the specified monitoring operation on the specified region X (S1004). More specifically, if the optical transmission device 100 is instructed to insert monitoring parameters in the specified region X, i.e. the monitoring start point, then the OH TERM 120 selects and extracts the specified monitoring parameters from the SEL 121 and inserts these into the specified region X. If the optical transmission device 100 is instructed to perform end-point processing of the monitoring parameters contained in the specified region X, i.e., the monitoring end point, then the OH TERM 120 is instructed to extract the monitoring parameters contained in the specified region X and perform end-point processing with the EXT 122. If the optical transmission devices 100 is instructed to pass through the monitoring parameters contained in the specified region X, i.e., monitoring relay points, then the OH TERM 120 is instructed to pass through the monitoring parameters contained in the specified region X without performing end-point processing.

5) For each monitoring zone, the optical transmission devices 100 included in the zone send their monitoring results to the optical transmission network administration device 10 (S1005). The monitoring results 53 are calculated or processed by monitoring the specified region X in the transmission signal 52. Each of the monitored optical transmission devices 100 sends monitoring results 53 to the optical transmission network administration device 10. Alternatively, it would also be possible for the optical transmission device 100, which performs end-point processing of the monitoring parameters in the specified region X, to monitor the monitoring parameters in the specified region X, tabulate the monitoring results 53 for the monitoring zone, and send the results to the optical transmission network administration device 10.

6) The optical wavelength signal on which monitoring operations were performed is then circuit-switched by the XC/ADM 130 or the OH TERM 120 to a desired optical transmission path port 160 (S1006).

The following is a description of a first embodiment of an optical transmission system according to the present invention. In this example, the settings from FIG. 3 and FIG. 4 will be used.

First, the monitoring zone in setting S1 of this embodiment will be described (bi-directional monitoring, monitoring zone between the optical transmission device 100A and the optical transmission device 100E).

1) The optical transmission network administration device 10 sends instruction signals 51 to each of the optical transmission devices 100A, 100B, 100C, 100D, and 100E in the monitoring zone of setting S1 so that monitoring operations based on the monitoring parameters indicated by the monitoring category information in setting S1 are performed on specified region X of transmission signals 52 transmitted to the monitoring zone of setting S1. More specifically, if a transmission signal 52 containing the specified region X is sent into the monitoring zone (i.e., the signal is received by way of the optical transmission path 40 from the left of the optical transmission device 100A or the optical transmission path 40 from the right of the optical transmission device 100E), instruction signals for generating and inserting the specified monitoring parameters are sent to the optical transmission device 100A and the optical transmission device 100E, which serve as the monitor starting points of setting S1.

If a transmission signal 52 containing the specified region X is sent out of the monitoring zone (i.e., the signal is transmitted by way of the optical transmission path 40 to the left of the optical transmission device 100A or the optical transmission path 40 to the right of the optical transmission device 100E), instruction signals for performing end-point processing of the monitoring parameters contained in the specified region X in the received transmission signal 52 are sent to the optical transmission device 100A and the optical transmission device 100E, which serve as the monitor end points of setting S1.

If a transmission signal 52 containing the specified region X is received, a pass-through instruction signal 51 is sent to the optical transmission devices 100B, 100C, and 100D, which serve as monitor relay points of the setting S1. As a result, the monitoring parameters contained in the specified region X in the received transmission signal 52 are monitored without having end-point processing performed.

2) The controller 110 in the optical transmission devices 100 receiving these instruction signals 51 instruct the XC/ADM 130 and the OH TERM 120 to perform monitoring operations according to the instruction signal 51. More specifically, if the optical transmission device 100A or 100E, i.e., the monitoring start points of setting S1, receives a transmission signal 52 containing the specified region X sent into the monitoring zone, the controller 110 instructs the XC/ADM 130 to send the received transmission signal 52 to the OH TERM 120 and instructs the OH TERM 120 to generate and insert specified monitoring parameters to the specified region X in the received transmission signal 52.

If the optical transmission device 100A or 100E, i.e., the monitoring end points of setting S1, receives a transmission signal 52 containing the specified region X output from the monitoring zone, the controller 110 instructs the XC/ADM 130 to send the received transmission signal 52 to the OH TERM 120 and instructs the OH TERM 120 to extract and perform end-point processing on the specified monitoring parameters in the specified region X of the received transmission signal 52.

If the optical transmission device 100B, 100C, or 100D, i.e., the monitoring relay points of setting S1, receives a transmission signal 52 containing the specified region X, the controller 110 instructs the XC/ADM 130 to send the received transmission signal 52 to the OH TERM 120 and instructs the OH TERM 120 to pass through the monitoring parameters in the specified region X of the received transmission signal 52 without performing end-point processing. For the optical transmission device 100B, 100C, or 100D, i.e., the relay points, it would also be possible when a transmission signal 52 containing the specified region X is received to have the controller 110 circuit-switch the transmission signal 52 containing the specified region X directly to a desired transmission port rather than instructing the XC/ADM 130 to send the received transmission signal 52 to the OH TERM 120. Also, in each of the optical transmission devices 100, it would also be possible to have control information stored in a storage device. By storing control information in this manner, control operations can be made faster since comparisons can be made with previous control information and changes can be made just for the differences.

3) In the optical transmission device 100A through 100E in the monitoring zone of setting S1, monitoring operations can be started after the controller 110 completes its control operations. More specifically, if the optical transmission device 100A or 100E, i.e., the monitoring start points of setting S1, receives a transmission signal 52 containing the specified region X sent into the monitoring zone, the XC/ADM 130 sends the received transmission signal 52 to the OH TERM 120, and the OH TERM 120 generates and inserts the specified monitoring parameters to the specified region X in the received transmission signal 52.

If the optical transmission device 100A or 100E, i.e., the monitoring end points of setting S1, receives a transmission signal 52 containing the specified region X output from the monitoring zone, the XC/ADM 130 sends the received transmission signal 52 to the OH TERM 120, and the OH TERM 120 extracts and performs end-point processing on the specified monitoring parameters in the specified region X of the received transmission signal 52.

If the optical transmission device 100B, 100C, or 100D, i.e., the monitoring relay points of setting S1, receives a transmission signal 52 containing the specified region X, the XC/ADM 130 sends the received transmission signal 52 to the OH TERM 120 and the OH TERM 120 passes through the monitoring parameters in the specified region X of the received transmission signal 52 without performing end-point processing.

In terms of the monitoring zone of setting S1, the optical transmission devices 100B, 100C, and 100D serve as relay optical transmission devices 100 performing pass-through operations on maintenance information in the specified region X of transmission signals 52. The optical transmission devices 100A and 100E serve as monitor start point optical transmission devices 100, performing generation and insertion of specified monitoring parameters while also serving as monitor end point optical transmission devices 100, performing end-point processing of monitoring parameters in the specified region X in the signals. The monitoring zones of settings S2, S3, and S4 are set up in a similar manner.

However, in the case of monitoring zones S2, S3, and S4, where the transmission paths comprise multiple optical wavelengths, the region Xi for each monitoring zone i comprises subregions. These subregions are designated as region Xi1, Xi2, . . . Xin, where n is the number of wavelengths in the transmission path. For example, region X21 refers to monitoring zone S2 and wavelength 1 in that monitoring zone. Similarly, the region corresponding to wavelength 3 in monitoring zone S4 would be identified as X43.

In terms of the monitoring zone of setting S2, the optical transmission devices 100C serves as the relay optical transmission device 100 and the optical transmission devices 100B and 100D serve as monitor start and end points. In terms of the monitoring zone of setting S3 (uni-directional monitoring), the optical transmission device 100E serves as the relay optical transmission device 100, the optical transmission device 100D serves as the monitor start point, and the optical transmission device 100F serves as the monitor end point. In terms of the monitoring zone of setting S4, the optical transmission devices 100B to 100E serve as the relay optical transmission devices 100, and the optical transmission devices 100A and 100F serve as monitor start and end points.

4) The optical transmission devices 100 receiving instruction signals 51 as described above monitor the monitoring parameters contained in the specified region X of the transmission signal 52 and generate monitoring results 53. The generated monitoring results 53 are sent to the optical transmission network administration device 10. It would also be possible to have the optical transmission device 100 that serves as the monitor end point of a monitoring zone tabulate the monitoring results 53 for its monitoring zone based on the monitoring parameters assigned in the specified region X in the transmission signal 52. These tabulated monitoring results 53 would be sent to the optical transmission network administration device 10. If the number of errors is to be monitored for the monitoring results 53, error detection codes, e.g., even parity bits (BIP parity), cyclic check bits (CRC bits), or error correction check bits, can be inserted in the region X when generating and inserting monitoring parameters including monitoring information 50. By checking the error detection codes when performing monitoring operations, the number of errors can be determined. If the error rate is to be monitored, the error rate can be calculated based on the number of errors.

Based on the monitoring information 50 entered by the operator for each monitoring zone (settings S1–S4), the optical transmission network administration device 10 sends instruction signals 51 to the optical transmission devices 100 contained in these monitoring zones so that monitoring operations are performed using the specified monitoring parameters in the respective specified regions—X1–X4 of the transmission signals 52, corresponding to the monitoring zones S1–S4.

The monitoring operations of this embodiment will be described in detail using the optical transmission device 100E of this embodiment as an example. The optical transmission device 100E is a monitor start point and end point in setting S1, a monitor relay point in setting S3, and a monitor relay point in setting S4.

First, the optical transmission device 100E that serves as a monitor start point and end point in setting S1 will be described.

Setting S1 corresponds to a predetermined region X1 in the transmission signal 52.

In the direction of a transmission proceeding from right to left, the optical transmission device 100E receives the transmission signal 52 from the optical transmission device 100F and generates and inserts into the region X1 monitoring parameters specified by the monitoring category information in setting S1. The transmission signal 52 into which monitoring parameters have been inserted is sent to the optical transmission device 100D.

In the direction of a transmission proceeding from left to right, after extracting the monitoring parameters contained in the region X1 in the transmission signal 52 received from the optical transmission device 100D and performing the specified monitoring operations, the optical transmission device 100E stores the monitoring parameters in the EXT 122. The monitoring parameters stored in the EXT 122 are calculated and processed so that monitoring results 53 for the monitoring zone of setting S1 are tabulated, and these monitoring results 53 are sent to the optical transmission network administration device 10.

Next, the optical transmission device 100E that serves as a monitor relay point in setting S3 and setting S4 will be described.

Setting S3 specifies a predetermined region X3 in the transmission signal 52. Setting S4 specifies a predetermined region X4 in the transmission signal 52.

The optical transmission device 100E receives the transmission signal 52 from the optical transmission device 100D or 100F and passes through the monitoring parameters contained in the specified region X3 or X4 without performing end-point processing. When performing the pass-through operation, other operations indicated in the setting S3 or setting S4 can be performed such as performing monitoring according to the monitoring parameters contained in the specified region X3 or X4.

Thus, the optical transmission device 100 of this embodiment can serve as monitoring start points, end points, and relay points for different monitoring zones. If a single optical transmission device 100 belongs to multiple monitoring zones, results from monitoring operations for each monitoring zone can be tabulated, and separate monitoring operations can be performed for each monitoring zone.

By changing the monitoring information 50, the operator can enter new monitoring information 50 to the optical transmission network administration device 10 at any time, and the optical transmission system can perform monitoring operations based on the entered monitoring information 50. If the operator enters new settings for the monitoring information 50 into the optical transmission network administration device 10, the corresponding optical 30 transmission devices 100 notify the optical transmission network administration device 10 when the indicated monitoring operations can be performed. When all corresponding optical transmission devices 100 can perform monitoring operations, the optical transmission network administration device 10 notifies the corresponding optical transmission devices 100 of this. The optical transmission devices 100 receive this notification and begin monitoring operations according to the new settings either immediately or according to starting conditions from the operator.

Until new settings are entered by the operator, the optical transmission devices 100 continue operating according to the prior instruction signals 51.

It would also be possible to have the instruction signal 51 be a signal that instructs insertion of specified monitoring parameters in the specified region X of the transmission signal 52 transmitted via the optical transmission path 40 and generation of end-point information for identifying the optical transmission device 100 that is to perform end-point processing of the monitoring parameters inserted in the specified region X, with this end-point information being inserted into specific bytes in the transmission signal 52. In this case, the specific bytes at which the end-point information used to identify the optical transmission device 100 that is to perform end-point processing of the monitoring parameters is determined dynamically by the optical transmission network administration device 10 each time monitoring information 50 is entered. Thus, to allow these bytes positions to be identified in the transmission signal 52, each of the monitored optical transmission device 100 is notified of the specific byte position. The optical transmission device 100 that serves as the monitor start point receives the instruction signal 51 and inserts the specified monitoring parameters in the specified region X and also inserts end-point information for identifying the optical transmission device 100 that serves as the monitor end point at the specific byte position. The optical transmission device 100 receives the transmission signal 52 and identifies the specific byte position of the end-point information used to determine the end point. The end-point information inserted at the byte position is interpreted to determine if it is the end-point optical transmission device 100. This can be done, for example, by having the monitor start point optical transmission device 100 inserting, at a specific byte position, the number of optical transmission device 100 needing to perform relay operations. Each monitor relay optical transmission device 100 decrements by 1 the value at the specific byte position. The optical transmission device 100 which decrements the value from 1 to 0 extracts the monitoring parameters from the specified region X and performs end-point processing.

If the optical transmission device 100 receiving the transmission signal 52 determines that it is the end-point optical transmission device 100, the monitoring parameters contained in the specified region X are extracted and end-point processing is performed.

Monitoring zones can be monitored as long as the optical transmission network administration device 10 can send instructions signals to at least the monitor start-point optical transmission device. Regardless of the network topology of the optical transmission network (ring, mesh, linear, star, and combinations thereof), a single monitoring zone will always be zone extending between two optical transmission devices as shown in FIG. 1. Thus, the first embodiment described above is not dependent on the network topology of the optical transmission network.

Figure 11:
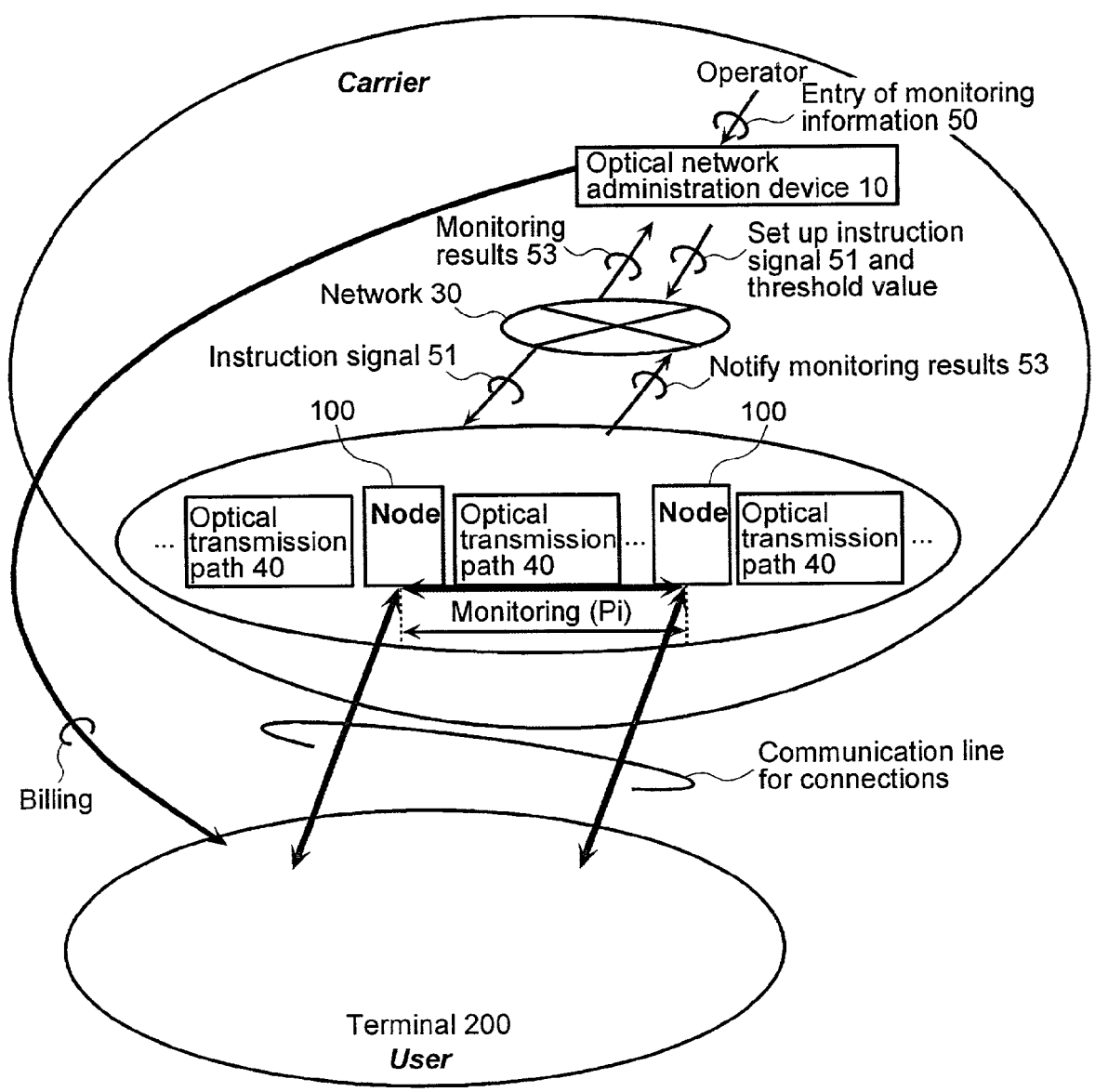
FIG. 11 is a drawing showing the overall architecture of an optical transmission system used in an optical transmission zone provider service according to an illustrative embodiment of the invention.

FIG. 11 shows the overall architecture of an optical transmission system that operates an optical transmission zone provider service using an optical transmission system according to this embodiment. The optical network provider that manages, maintains, and operates the optical transmission network leases some of its transmission zones. The usage fee is calculated by an accounting processing module 14 of the optical transmission network administration device 10 for each leased transmission zone, and the user is charged according to this.

The optical transmission system according to this embodiment includes an optical transmission system having the architecture shown in FIG. 1 and a terminal 200 belonging to the user leasing transmission zones (the user can be another network provider). The terminal 200 is connected to the transmission network by way of the optical transmission devices 100 at the ends of the leased transmission zone and a pair of communication lines.

Figure 12:
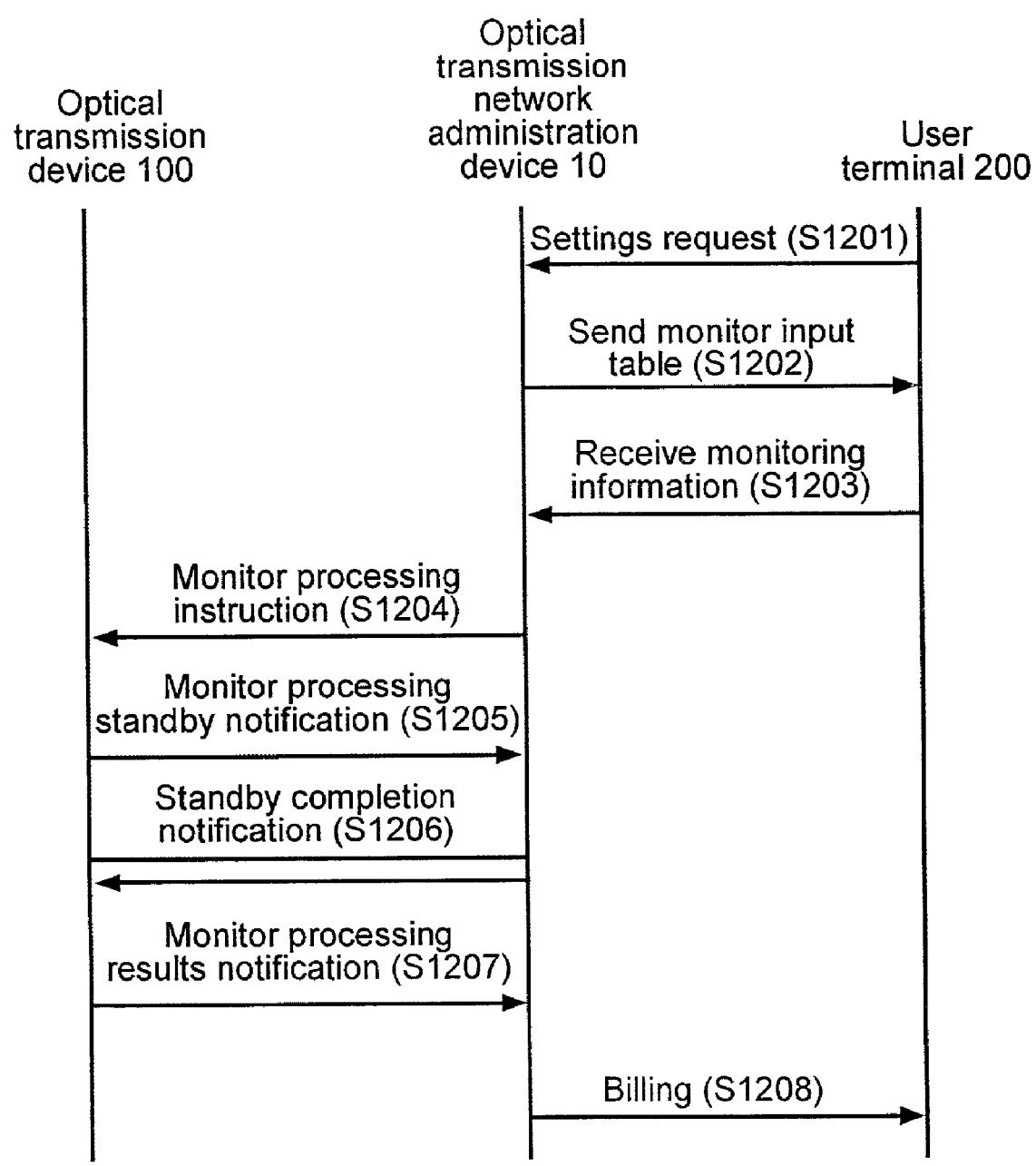
FIG. 12 is a flowchart showing the operations performed in an optical transmission zone provider service according to an illustrative embodiment of the invention.

FIG. 12 shows the sequence of operations performed in operating an optical transmission zone provider service using an optical transmission system according to this embodiment. The optical transmission network administration device 10 of this embodiment can receive requests to set up and change information relating to monitoring operations, e.g., monitoring categories, from the terminal 200 of the user leasing the transmission zone. The optical transmission network administration device 10 generates instruction signals 51 to be sent to the optical transmission device 100 to be monitored.

1) First, the optical transmission network administration device 10 receives a request to set up/change information relating to monitoring operations, e.g., monitoring categories, from the terminal 200 of the user leasing the transmission zone (S1201).

2) Based on the request to set up/change information, the optical transmission network administration device 10 sends to the terminal 200 a monitor entry table such as the one shown in FIG. 3 to allow entry of monitoring information 50, e.g., monitoring categories (S1202).

3) The terminal 200 uses an output module 201 to output the received monitor entry table and instructions such as input steps. The received monitor entry table can be edited. The user follows the instructions and enters the required monitoring information 50 in the terminal 200 using a Graphical User Interface (GUI) or the like. The monitoring information 50 entered in the terminal 200 is sent to the optical transmission network administration device 10 (S1203).

4) Based on the entered monitoring information 50, the optical transmission network administration device 10 identifies the optical transmission devices 100 to be monitored in the monitoring zone, the region X in the transmission signal 52 to be used for monitoring operations, and the specified monitoring categories.

The optical transmission network administration device 10 generates and sends instruction signals 51 for the optical transmission devices 100 to be monitored so that the optical transmission devices 100 perform the indicated monitoring operations (S1204).

5) Based on the received instruction signal 51, each optical transmission device 100 controls the XC/ADM 130 and the OH TERM 120 so that the indicated monitoring operations are performed. When an optical transmission device 100 is ready, it notifies the optical transmission network administration device 10 (S1205). The optical transmission network administration device 10 determines through these notifications when all the optical transmission device 100 in the monitoring zone are ready, and then notifies these optical transmission devices 100 of standby completion (S1206).

6) When an optical transmission device 100 receives the transmission signal 52 via the optical transmission path 40, it performs the indicated monitoring operations. The optical transmission device 100 sends the monitoring results 53 (e.g., error count or error rate) to the optical transmission network administration device 10 (S1207).

7) The monitor processing module of the optical transmission network administration device 10 calculates and records usage fees for each leased transmission zone and performs accounting operations of usage fees for each leased transmission zone based on the monitoring results 53. The communication fees can be determined, for example, based on the lease period, communication circuit usage time, communication circuit usage rate per unit time, distances of leased transmission zones, or combinations thereof. The optical transmission network administration device 10 sends the user terminal 200 an invoice of the usage fee determined based on the monitoring results 53 for each leased transmission zone (S1208). The terminal 200 outputs the received invoice to the output screen or the like.

Figure 13:
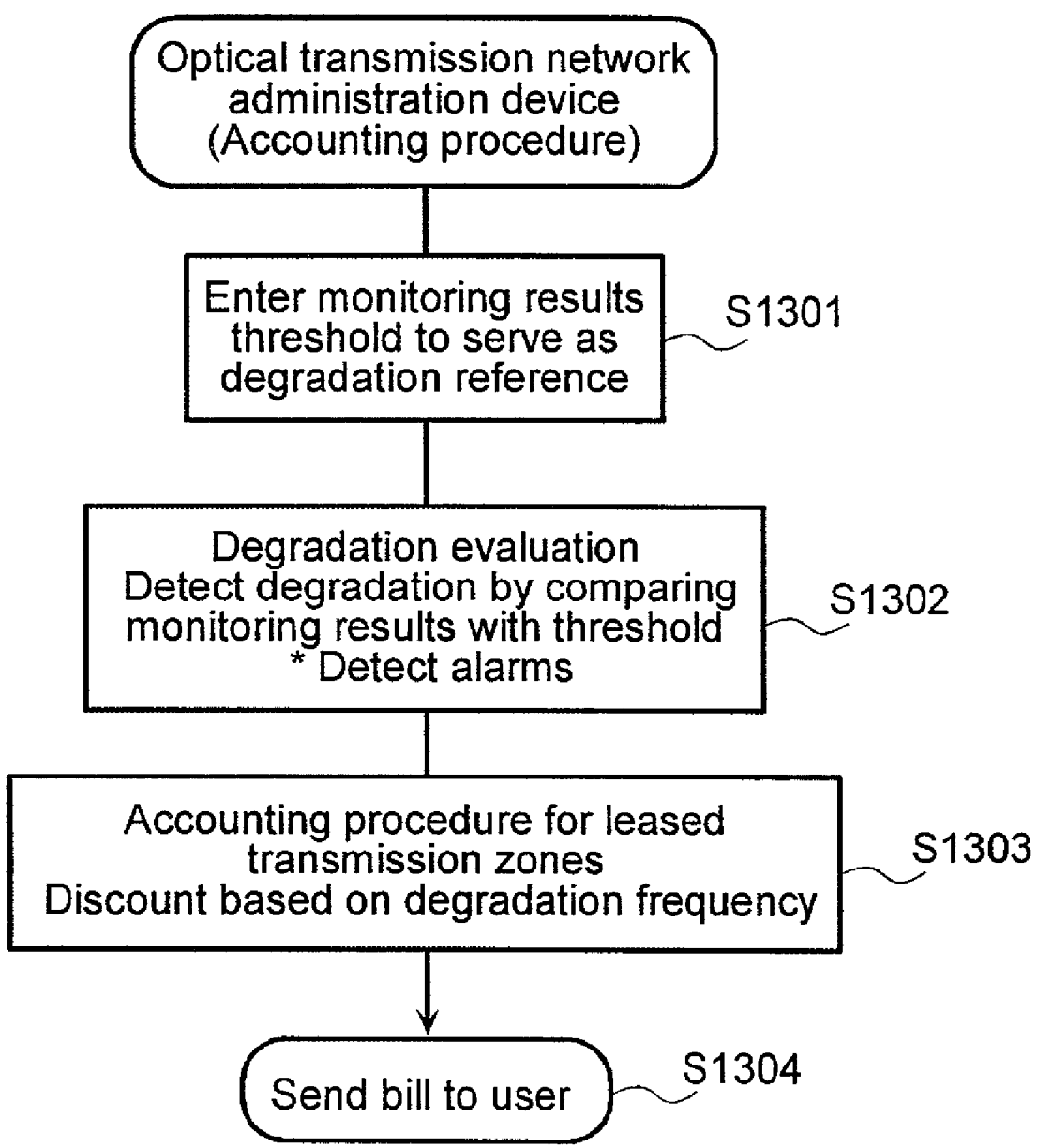
FIG. 13 is a flowchart showing the accounting operations performed according to an illustrative embodiment of the invention.

FIG. 13 is a flowchart of the communication fee accounting operations performed based on the monitoring results 53 from the leased transmission zones.

1) For each leased transmission zone, the operator enters a threshold value for the monitoring results 53 to serve as a reference for the accounting operations (S1301). It would also be possible to set up multiple threshold values for the monitoring results 53 in each of the transmission zones. For example, if communication fees are to be based on communication quality, the threshold value of the monitoring results 53 used for accounting can be a reference quality. Alternatively, multiple levels of reference qualities can be set up. For the threshold values of the monitoring results 53, various variations can be provided and selected by the user.

2) The optical transmission network administration device 10 compares the monitoring results 53 indicating the communication quality in the leased zones with the threshold values serving as an accounting reference, thus providing an evaluation of communication quality (S1302). This evaluation can also be made based on receipt of alarms (e.g., lost signal, transmission signal 52 out-of-sync, failure in an upstream optical transmission device 100 as well as backward failure alarms).

3) The optical transmission network administration device 10 performs accounting operations based on the results of this evaluation (S1303). If the communication quality is evaluated as bad, the fee is discounted an amount set up ahead of time between the network provider X and the user Y, an amount based on a fixed proportion of the communication fee, an amount based on bad communication quality as measured by a timer, or the like. This is then recorded as the invoice fee in a recording module.

4) Each time a fixed period elapses, the recorded invoice fee is sent to the user terminal 200 by the optical transmission network administration device 10 (S1304). The terminal 200 receives the invoice fee and outputs it to the output module 201 so that the user can see. It would also be possible to send the user terminal 200 the threshold value for the monitoring results 53 used as an accounting reference along with the monitoring results. These can be sent along with the invoice fee and output from the terminal 200.

With the optical transmission zone provider service using the transmission system of this embodiment, monitoring results can be tabulated for each of multiple leased transmission zones. This allows fees to be set according to communication quality evaluated in a real-time manner, and the user with provided with leased service for multiple transmission zones.

With the optical transmission system according to this embodiment, transmission zones in an optical transmission network can be set up or changed in a flexible manner, and an optical transmission system can be provided that allows simultaneous monitoring of communication quality for each of these monitoring zones.

Also, with an optical transmission zone provider service according to this embodiment, a service where multiple transmission zones are leased to a user can be provided.

What is claimed is:

1. In an optical path comprising a plurality of optical transmission devices for transmission of a transmission signal therealong, each device receiving said transmission signal and transmitting said transmission signal, said transmission signal comprising an overhead portion and a payload portion, a method for monitoring said optical transmission path comprising:

identifying a first set of said optical transmission devices associated with a first monitoring zone, said first set of optical transmission devices including first and second optical transmission devices designated as first and second end-point devices, the remaining optical transmission devices in said first set being designated as first relay devices;

identifying a second set of said optical transmission devices associated with a second monitoring zone, said second set of optical transmission devices including third and fourth optical transmission devices designated as third and fourth end-point devices, the remaining optical transmission devices in said second set being designated as second relay devices;

transmitting first insertion-type instruction signal to said first end-point device, said first insertion-type signal informs said first end-point device of a first monitoring information signal for monitoring said first monitoring zone and a first overhead portion for storing said first monitoring information signal and instructs insertion of said first monitoring information signal in said first overhead portion of a received transmission signal, said first end-point device thereby modifying said transmission signal by inserting said first monitoring information signal into said first overhead portion of said transmission signal and transmitting said transmission signal as modified;

transmitting second insertion-type instruction signal to said third end-point device, said second insertion-type signal informs said third end-point device of a second monitoring information signal for monitoring said second monitoring zone and a second overhead portion for storing said second monitoring information signal and instructs insertion of said second monitoring information signal in said second overhead portion of a received transmission signal, said third end-point device thereby modifying said transmission signal by inserting said second monitoring information signal into said second overhead portion of said transmission signal and transmitting said transmission signal as modified;

transmitting passthrough-type instruction signals to said first relay devices and to said second relay devices, said passthrough-type instruction signals inform said first or second monitoring information signal and said first or second overhead portion; and transmitting end-point processing type instruction signals to said second and fourth end-point devices, said end-point type instruction signals inform said first or second monitoring information signal and said first or second overhead portion.

2. The method of claim 1 further including receiving user-provided information representative of said first and second monitoring zones, wherein said optical transmission devices comprising said first and second sets are dependent on said user-provided information.

3. The method of claim 1 wherein if said first and second monitoring zones overlap such that some of said optical transmission devices belong both to said first set of optical transmission devices and to said second set of optical transmission devices, then said first and second overhead portion of said transmission signal are different portion.

4. The method of claim 1 wherein if said first and second monitoring zones do not overlap, then said first and second overhead portion of said transmission signal are the same portion.

5. The method of claim 1 further including for each of said first relay devices and each of said second relay devices, in response to receiving said passthrough-type instruction signals, transmitting a received transmission signal which includes monitoring information signals in a manner that does not modify said monitoring information signals.

6. The method of claim 1 further including for each of said second and fourth end-point devices, in response to receiving said end-point processing type instruction signal, performing end-point processing based on monitoring information signals contained in a received transmission signal.

7. The method of claim 1 wherein a first portion of each of said first and second insertion-type instruction signals is representative of optical transmission path monitoring parameters, said first monitoring information signals being based on said first portion of said first insertion-type instruction signal, said second monitoring information signals being based on said first portion of said second insertion-type instruction signal.

8. The method of claim 1 further including transmitting said insertion-type, said passthrough-type, and said end-point type instruction signals from a first location.

9. The method of claim 8 wherein said end-point processing includes transmitting monitor processing result signals to said first location.

10. The method of claim 1 wherein said overhead portion is a part of an overhead of SDH or SONET and wherein said overhead portion is unused.

* * * * *